United States Patent
Oiwa et al.

(10) Patent No.: US 12,298,391 B2
(45) Date of Patent: May 13, 2025

(54) DOPPLER COMPENSATION SYSTEM AND DOPPLER COMPENSATION METHOD

(71) Applicant: NIPPON TELEGRAPH AND TELEPHONE CORPORATION, Tokyo (JP)

(72) Inventors: Miharu Oiwa, Musashino (JP); Toshimitsu Tsubaki, Musashino (JP); Hiroyuki Fukumoto, Musashino (JP); Yosuke Fujino, Musashino (JP); Marina Nakano, Musashino (JP); Yuya Ito, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 196 days.

(21) Appl. No.: 18/036,154

(22) PCT Filed: Nov. 17, 2020

(86) PCT No.: PCT/JP2020/042768
§ 371 (c)(1),
(2) Date: May 9, 2023

(87) PCT Pub. No.: WO2022/107195
PCT Pub. Date: May 27, 2022

(65) Prior Publication Data
US 2024/0019574 A1   Jan. 18, 2024

(51) Int. Cl.
*G01S 15/58* (2006.01)
*G01S 7/536* (2006.01)

(52) U.S. Cl.
CPC .......... *G01S 15/586* (2013.01); *G01S 7/536* (2013.01)

(58) Field of Classification Search
CPC ........ G01S 15/586; G01S 7/536; G01S 3/802; H04B 11/00
(Continued)

(56) References Cited

PUBLICATIONS

K. A. Perrine, et al., "Doppler estimation and correction for shallow underwater acoustic communications," 2010 Conference Record of the Forty Fourth Asilomar Conference on Signals, Systems and Computers, 2010, pp. 746-pp. 750.
(Continued)

*Primary Examiner* — Daniel L Murphy
(74) *Attorney, Agent, or Firm* — Harness, Dickey & Pierce, P.L.C.

(57) ABSTRACT

An aspect of the present invention is a Doppler compensation system including: a sound wave receiving element that receives a sound wave transmitted by a transmitter; a ground-speed-related quantity acquisition unit that acquires a ground-speed-related quantity that is a physical quantity related to a vector representing a ground speed of a receiver including the sound wave receiving element based on an acceleration of the receiver; an extraction unit that extracts a sound wave including an estimation target sound wave that is a sound wave to be estimated from among sound waves received by the receiver; an arrival direction estimation unit that estimates an arrival direction of the estimation target sound wave based on the estimation target sound wave; a reception-direction-speed-related quantity estimation unit that estimates a quantity related to a speed in a reception direction that is a direction in which the estimation target sound wave viewed from the receiver arrives based on the ground-speed-related quantity and a result of the estimation from the arrival direction estimation unit; and a Doppler compensation unit that compensates for waveform distortion due to Doppler effect of the estimation target sound wave based on a result of the estimation from the reception-direction-speed-related quantity estimation unit.

8 Claims, 9 Drawing Sheets

(58) Field of Classification Search
USPC .......................................................... 367/90
See application file for complete search history.

(56) References Cited

PUBLICATIONS

Futoshi Asano, Takanobu Nishiura, "Sound source localization" Knowledge Base Forest of Knowledge, The Institute of Electronics, Information and Communication Engineers, Group 2, vol. 6, Chapter 3, 2012.

Baosheng Li, et al., "Non-Uniform Doppler Compensation for Zero-Padded OFDM over Fast-Varying Underwater Acoustic Channels", IEEE Oceans 2007—Europe, Aberdeen, Scotland, 18-21, Jun. 2007, pp. 1-pp. 6.

B. S. Sharif, et al., "A Computationally Efficient Doppler Compensation System for Underwater Acoustic Communications," IEEE Journal of Oceanic Engineering, vol. 25, No. 1, pp. 52-pp. 61, Jan. 2000.

Tomoki Murakami, Riku Omiya, Toshiro Nakahira, Koichi Ishihara, Takafumi Hayashi, "Proposal of Virtual Massive MIMO (VM-MIMO)", The Institute of Electronics, Information and Communication Engineers (IEICE) General Conference, Waseda University, Tokyo, Mar. 19 to 22, 2019, B-1-123.

DOPPLER COMPENSATION SYSTEM AND DOPPLER COMPENSATION METHOD

CROSS-REFERENCE TO RELATED APPLICATIONS

This application is a 371 U.S. National Phase of International Application No. PCT/JP2020/042768, filed on Nov. 17, 2020. The entire disclosure of the above application is incorporated herein by reference.

TECHNICAL FIELD

The present invention relates to a Doppler compensation system and a Doppler compensation method.

BACKGROUND ART

There is a technique for performing communication using sound waves in water. Such communication in water may be performed in a situation where a receiver moves, and waveform distortion due to the Doppler effect may be a problem.

Here, waveform distortion due to the Doppler effect will be briefly described. The Doppler effect is often described in textbooks and the like by taking the sound of an ambulance siren passing in front of one as an example. In such textbook descriptions, the Doppler effect is described as a phenomenon that occurs when the relative speed between a sound source and a receiver of the sound waves change, and a frequency of the sound waves emitted by the sound source and a frequency of the sound waves received by the receiver are different.

However, in fact, in such textbook descriptions, the sound wave emitted by a sound source are assumed to be approximate plane waves for simplicity of description, and only a shift of a frequency called a Doppler shift is described using the approximate plane waves. In an actual situation, the sound emitted from the sound source is often a composite wave. In particular, since the sound wave used for communication needs to have a different waveform for each type of communication content, the sound waves are often a composite wave.

As can be seen from the formula of the Fourier expansion, the composite wave is a result of superposition of a plurality of plane waves. Therefore, the Doppler effect on the composite wave is an effect of individually changing the frequency of each plane wave appearing in the Fourier expansion. Since the frequency of each plane wave appearing in the Fourier expansion individually changes, the Doppler effect on the composite wave is an effect of distorting the waveform of the composite wave. Since many signals used for communication are composite waves, the waveform may be distorted due to the Doppler effect.

In communication using sound waves in water, the moving speed of the receiver changes due to the influence of waves, the influence of sea surface fluctuations, and the like. At this time, since the propagation speed of the sound waves is much lower than that of the radio wave, the Doppler shift amount changes more quickly than that it does with the radio waves. Therefore, as a technique for sequentially estimating and compensating for the change amount of the Doppler shift, there is a technique for transmitting known unmodulated sound waves from a transmitter, receiving the unmodulated sound waves by a receiver, and sequentially compensating for waveform distortion due to the Doppler effect on the basis of the received unmodulated sound waves (see Non Patent Literature 1).

CITATION LIST

Non Patent Literature

Non Patent Literature 1: K. A. Perrine, et al, "Doppler estimation and correction for shallow underwater acoustic communications," 2010 Conference Record of the Forty Fourth Asilomar Conference on Signals, Systems and Computers, 2010, pp. 746-pp. 750.

SUMMARY OF INVENTION

Technical Problem

However, in a technique using unmodulated sound waves, the accuracy of waveform distortion compensation due to the Doppler effect may decrease. For example, in a situation where a sound wave reaches a receiver after being strongly reflected or scattered on the sea surface, a composite wave of various sound waves arriving through different paths reaches the receiver. Different paths are influenced differently by the Doppler effect. Therefore, the composite wave observed by the receiver is a composite wave in which each plane wave forming the composite wave has a different shift amount. That is, the receiver observes a composite wave in which different amounts of Doppler shift are combined.

This occurs for both modulated and unmodulated sound waves. Therefore, even if the transmitter transmits an unmodulated sound wave, the wave observed by the receiver is a sound wave with a distorted waveform, and the accuracy with which the receiver compensates for waveform distortion due to the Doppler effect may decrease.

Such a problem is not limited to communication in water, and may occur even in communication in air or communication in which a propagation path of a sound wave is solid.

In view of the above circumstances, an object of the present invention is to provide a technique for reducing the influence of the Doppler effect on communication.

Solution to Problem

According to an aspect of the present invention, there is provided a Doppler compensation system including: a sound wave receiving element configured to receive a sound wave transmitted by a transmitter; a ground-speed-related quantity acquisition unit configured to acquire a ground-speed-related quantity that is a physical quantity related to a vector representing a ground speed of a receiver including the sound wave receiving element based on an acceleration of the receiver; an extraction unit configured to extract an estimation target sound wave that is a sound wave to be estimated from among sound waves received by the receiver; an arrival direction estimation unit configured to estimate an arrival direction of the estimation target sound wave based on the estimation target sound wave; a reception-direction-speed-related quantity estimation unit configured to estimate a quantity related to a speed in a reception direction of the receiver that is a direction in which the estimation target sound wave viewed from the receiver arrives based on the ground-speed-related quantity acquired by the ground-speed-related quantity acquisition unit and a result of the estimation from the arrival direction estimation unit; and a Doppler compensation unit configured to compensate for waveform distortion due to Doppler effect of the estimation target sound wave based on a result of the estimation from the reception-direction-speed-related quantity estimation unit.

Advantageous Effects of Invention

According to the present invention, it is possible to provide a technique for reducing the influence of the Doppler effect on communication.

DESCRIPTION OF EMBODIMENTS

Embodiment

Figure 1:
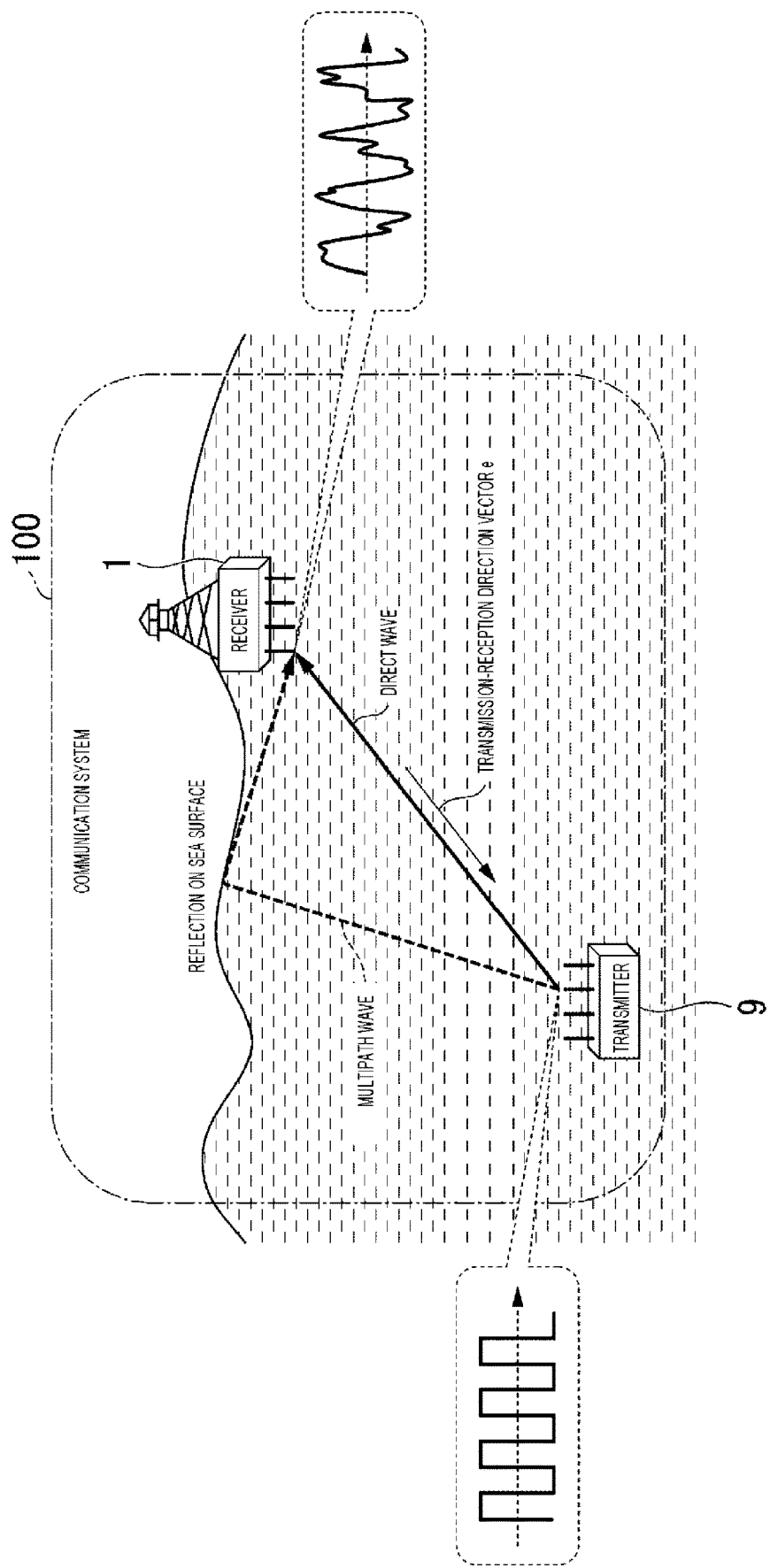
FIG. 1 is an explanatory diagram illustrating a communication system 100 according to an embodiment.

FIG. 1 is an explanatory diagram illustrating a communication system 100 according to an embodiment. Hereinafter, for simplicity of description, the communication system 100 will be described by taking a case where a wave carrying a signal is a sound wave and a medium through which the sound wave propagates is water as an example. However, the communication system 100 is not necessarily used in water. The communication system 100 may be used, for example, in air. In such a case, the medium through which the sound wave propagates is, for example, air. In addition, the medium through which the sound wave propagates may be, for example, a solid.

The communication system 100 includes a transmitter 9 and a receiver 1. The transmitter 9 transmits a sound wave (hereinafter referred to as a "data wave") carrying data indicating communication content to the receiver 1.

The data wave received by the receiver 1 and transmitted by the transmitter 9 includes a multipath wave and a direct wave. The multipath wave is a sound wave that is transmitted from the transmitter 9 and that reaches the receiver 1 after being reflected or scattered at a boundary surface of a substance such as a sea surface or a scatterer. The direct wave is a sound wave that reaches the receiver 1 without being reflected or scattered at the boundary surface of the substance. In this way, there are various paths through which the data wave transmitted by the transmitter 9 reaches the receiver 1. Therefore, the waveform of the sound wave received by the receiver 1 is a waveform that is more distorted than the waveform of the sound wave transmitted by the transmitter 9.

The receiver 1 receives the data wave transmitted by the transmitter 9. The receiver 1 is a moving body such as a drone, for example. The receiver 1 compensates for waveform distortion due to the Doppler effect of the received data wave itself using the received data wave.

The receiver 1 compensates for waveform distortion of a data wave due to the Doppler effect on the basis of a ground acceleration vector representing an acceleration (hereinafter referred to as a "ground acceleration") of the receiver 1 with respect to the ground and information indicating a direction in which a signal transmitted from the transmitter 9 arrives at the receiver 1. The information indicating the direction in which the signal transmitted from the transmitter 9 arrives at the receiver 1 (hereinafter referred to as "reception direction information") is, for example, information indicating the direction in which the transmitter 9 is viewed from the receiver 1 in which the direct wave arrives or the direction in which the multipath wave viewed from the receiver 1 arrives (hereinafter referred to as a "reception direction"). The reception direction information is, for example, information indicating a vector (hereinafter referred to as a "reception direction vector") in a direction in which a direct wave or a multipath wave arrives as viewed from the receiver 1.

The reception direction vector indicated by the reception direction information only needs to indicate the reception direction, and the length may be any length. For example, the length of the reception direction vector may be 1. Hereinafter, for simplicity of description, the communication system 100 will be described by taking a case where the information indicated by the reception direction information is information indicating a reception direction vector as an example. The direction of the reception direction vector is opposite to the propagation direction of the direct wave or the multipath wave.

The ground acceleration vector is a result of measurement by an acceleration sensor included in the receiver 1. The receiver 1 acquires a ground-speed-related quantity based on the ground acceleration vector. The ground-speed-related quantity is a physical quantity related to a vector (hereinafter referred to as a "ground speed vector") representing the ground speed of the receiver 1. The ground-speed-related quantity is, for example, the ground speed vector itself of the receiver 1. The ground-speed-related quantity is, for example, a change amount in the ground speed vector of the receiver 1 in a predetermined period. Hereinafter, processing of acquiring the ground-speed-related quantity based on the ground acceleration vector is referred to as ground-speed-related quantity acquisition processing.

<Ground-Speed-Related Quantity Acquisition Processing>

The ground-speed-related quantity acquisition processing will be described. Since the receiver 1 includes the acceleration sensor, the acceleration vector acquired by the acceleration sensor represents an acceleration vector (that is, a ground acceleration vector) of the receiver 1 with respect to the ground.

The ground acceleration vector acquired by the acceleration sensor is, for example, a vector representing the ground acceleration in each direction represented by three orthogonal axes. In such a case, the ground acceleration vector acquired by the acceleration sensor is expressed by a three-dimensional vector. Note that the ground acceleration vector acquired by the acceleration sensor may be one-dimensional vector or may be a multi-dimensional vector of two or more dimensions.

The ground-speed-related quantity acquisition processing may be any processing as long as it is processing of acquiring the ground-speed-related quantity based on the ground acceleration vector acquired by the acceleration sensor. The ground speed acquisition processing may be, for example, processing of performing time integration on a ground acceleration vector acquired by an acceleration sensor under a condition that an integration range is a predetermined unit time.

More specifically, the ground-speed-related quantity acquisition processing is, for example, processing represented by the following Formula (1).

[Math. 1]

$$V_r = \int A_t dt + V_0 \tag{1}$$

A vector $V_r$ on the left side of Formula (1) is a vector (hereinafter referred to as a "ground-speed-related quantity vector") representing the ground-speed-related quantity of the receiver 1. t represents time. A vector $A_t$ represents a ground acceleration vector at time t. $V_0$ is a speed vector representing the speed of the receiver 1 at the lower limit time of the time integration (that is, the start time of the unit time). As the value of the speed vector $V_0$, for example, a speed vector in which all elements are 0 may be used, or a speed vector representing the ground speed of the receiver 1 at the start time of the unit time may be used.

When a ground speed vector (hereinafter referred to as a "ground initial speed vector") representing the speed of the receiver 1 at the start time of the unit time is used as the speed vector $V_0$, the ground-speed-related quantity is the ground speed vector of the receiver 1. A method of acquiring the ground initial speed vector will be described in a modification. When a speed vector in which all elements are 0 is used as the speed vector $V_0$, the ground-speed-related quantity is a change amount of the ground speed vector of the receiver 1 in a predetermined unit time. In the following description, for the sake of simplicity, the communication system 100 will be described by taking a case where the ground-speed-related quantity is a ground speed vector as an example.

The reception direction information is obtained by performing extraction processing and arrival direction estimation processing using an array of devices (hereinafter referred to as "sound wave receiving elements") that receive sound waves such as data waves. Since the reception direction information is obtained by performing the extraction processing and the arrival direction estimation processing, the details of the processing of acquiring the reception direction information will be described after the description of the extraction processing and the arrival direction estimation processing.

The receiver 1 includes the sound wave receiving elements. The sound wave receiving elements are, for example, hydrophones. When the communication system 100 is used in air, the sound wave receiving elements are, for example, microphones.

<Extraction Processing>

The extraction processing is processing of extracting, from among various sound waves arriving at the receiver 1, a time of arrival (hereinafter referred to as an "arrival time") at which a sound wave to be estimated (hereinafter referred to as an "estimation target sound wave") to be subjected to the arrival direction estimation processing arrives at the receiver 1 and a sound wave including the estimation target sound wave based on the arrival time. The estimation target sound wave is also a sound wave to be compensated for waveform distortion due to the Doppler effect. The sound wave including the estimation target sound wave is a sound wave obtained by adding the estimation target sound wave received by the receiver 1 and a sound wave other than the estimation target sound wave received by the receiver 1 at the same time as the estimation target sound wave. The sound wave other than the estimation target sound wave is, for example, a multipath wave or noise when the estimation target sound wave is a direct wave.

For the sake of simplicity, extraction processing using a time-series signal will be described. The extraction processing is processing of extracting the arrival time of the estimation target sound wave and the time series including the estimation target sound wave based on a time series $\phi(t)$ of a cross-correlation value. t is a time. In the extraction processing, after the cross-correlation value is acquired, for example, the time t at which the cross-correlation value $\phi(t)$ becomes a maximum is estimated as the arrival time of the direct wave, the sound wave arriving at the receiver 1 after the time t is estimated as the sound wave including the estimation target sound wave, and the estimated sound wave is extracted. In this way, sound waves including the estimation target sound wave are acquired from various sound waves arriving at the receiver 1 by execution of the extraction processing.

Note that, more specifically, the extraction processing is processing of estimating a time-series signal including an estimation target time-series signal from among the plurality of time-series signals output from the sound wave receiving element based on the arrival time of the estimation target sound wave, and separating and acquiring (that is, extracting) the estimated time-series signal from other time-series signals. The estimation target time-series signal is a time-series signal representing the estimation target sound wave. The time-series signal including the estimation target time-series signal is a time-series signal representing a sound wave including the estimation target sound wave. The time-series signal is a result of conversion of a sound wave received by the sound wave receiving element into a signal such as an electrical signal or an optical signal by the sound wave receiving element itself. Therefore, the time-series signal is a signal representing the time series of the sound wave. The processing of extracting the estimated time-series signal may be, for example, processing of extracting only a signal representing the estimated time-series signal by a filter including a circuit such as an electric circuit or an optical circuit.

As described above, the extraction of the sound wave specifically means acquisition of a signal representing the time series of the sound wave.

Note that the signal representing the time series of the sound wave is a time series satisfying the time series condition. The time series condition is a condition that each sample at each time indicates the intensity of the sound wave received by the sound wave receiving element at each time.

Note that the extraction processing may be performed using any signal as long as the cross-correlation value including the estimation target sound wave can be calculated by extracting the time-series signal. For example, it may be performed by a frequency series signal. The frequency series signal is a signal obtained by Fourier transform of the time-series signal. In the following description, a time-series signal is used for the sake of simplicity.

<Cross-Correlation Value>

The cross-correlation value will be described. The cross-correlation value is a value representing a correlation between an arbitrary time series or a predetermined time series (hereinafter referred to as a "known time series") and a time series of sound waves received by each sound wave receiving element. The representing of the correlation means that the degree of similarity is represented.

The cross-correlation value is represented by, for example, the following Formula (2).

[Math. 2]

$$\phi_n(t) = \int_0^K w(k) x_n(k+t) dk \qquad (2)$$

n is an integer of 1 or more and N or less. N is the number of sound wave receiving elements. Thus, $x_n$ represents a time series of sound waves received by an n-th sound wave receiving element of the N sound wave receiving elements. w(k) represents a known time series. K represents the length of the time domain of w(t). k represents a time. t is a delay time from the start time of $x_n$.

Note that, as is clear from the definition of the cross-correlation value, if the known signal that is a signal representing the known time series is a signal representing the time series of the signal transmitted by the transmitter 9, the sound wave arriving at the time t at which the cross-correlation value becomes a maximum is a direct wave. This is because, as the path through which the sound wave arrives at the sound wave receiving element becomes longer, a magnitude of the sound wave, that is, an absolute value of $x_n(t)$ at each time t decreases, and the cross-correlation value decreases. Therefore, for example, in an environment approximated by a two-wave model as illustrated in FIG. 1, in a case where the known signal is a signal representing a time series of a signal transmitted by the transmitter 9, a sound wave arriving at a time at which the cross-correlation value is the second is a multipath wave reflected on the sea surface and arriving at the receiver 1.

Since the value of the cross-correlation value decreases as the path is different from the direct wave, in the extraction processing, the time series including the sound wave arriving from the direction according to a selection rule can be extracted without being limited to whether or not the path is the direct wave. The selection rule is a rule using a cross-correlation value, and is a rule for selecting an estimation target sound wave. The selection rule is, for example, a rule in which the known time series represents a time series of signals transmitted by the transmitter 9, and in the extraction processing, a time-series signal including an arrival time of an estimation target sound wave and the estimation target sound wave is estimated using a sound wave arriving at a time at which the cross-correlation value is a P-th (P is an integer of 1 or more) value as an estimation target sound wave. The selection rule is a rule determined before the extraction processing is executed. The selection rule may be set by the user or may be determined in advance at the point in time of construction of the communication system 100.

As described above, in the extraction processing, it is not always necessary to estimate the time series including the sound wave arriving at the time at which the cross-correlation value becomes a maximum, and the sound wave arriving at the time at which the cross-correlation value is P-th (P is an integer of 1 or more) largest may be estimated. For the sake of simplicity of the following description, the communication system 100 will be described by taking a case where the selection rule is a rule in which the known time series represents a time series representing a signal transmitted by the transmitter 9, and in the extraction processing, a sound wave arriving at a time at which the cross-correlation value is the first largest is estimated as an estimation target sound wave as an example. Note that the known time series represents a time series of signals transmitted by the transmitter 9, and in the extraction processing, when a sound wave arriving at a time at which the cross-correlation value is the largest is estimated as an estimation target sound wave, the estimation target sound wave is a direct wave.

<Description of Arrival Direction Estimation Processing>

The arrival direction estimation processing will be described. The arrival direction estimation processing is processing of estimating a direction (hereinafter referred to as an "arrival direction") in which the estimation target sound wave has arrived based on at least the arrival time of the estimation target sound wave estimated by the extraction processing and the element arrangement information. The element arrangement information is information indicating the arrangement of the sound wave receiving element in the receiver 1.

The arrival direction estimation processing is, for example, processing of executing the method described in Section 3-1 of Reference Literature 1.

Reference Literature 1: Futoshi Asano, Takanobu Nishiura, "Sound source localization" Knowledge Base Forest of Knowledge, The Institute of Electronics, Information and Communication Engineers, Group 2, Volume 6, Chapter 3, 2012

The method described in Section 3-1 of Reference Literature 1 is a method of estimating the arrival direction based on the time difference between the sound wave receiving elements at the time at which the sound wave receiving element receives the estimation target sound wave and the element arrangement information. When the estimation target sound wave is a direct wave, the arrival direction is parallel to the direction in which the transmitter 9 is viewed from the receiver 1. Therefore, information indicating the direction in which the transmitter 9 is viewed (that is, reception direction information) is obtained from the receiver 1 by the method described in Section 3-1 of Reference Literature 1.

In the method described in Section 3-1 of Reference Literature 1, the time difference between the sound wave receiving elements at the time at which the sound wave receiving element receives the estimation target sound wave is acquired using the time-series signal including the estimation target time-series signal received by the plurality of sound wave receiving elements.

Figure 2:
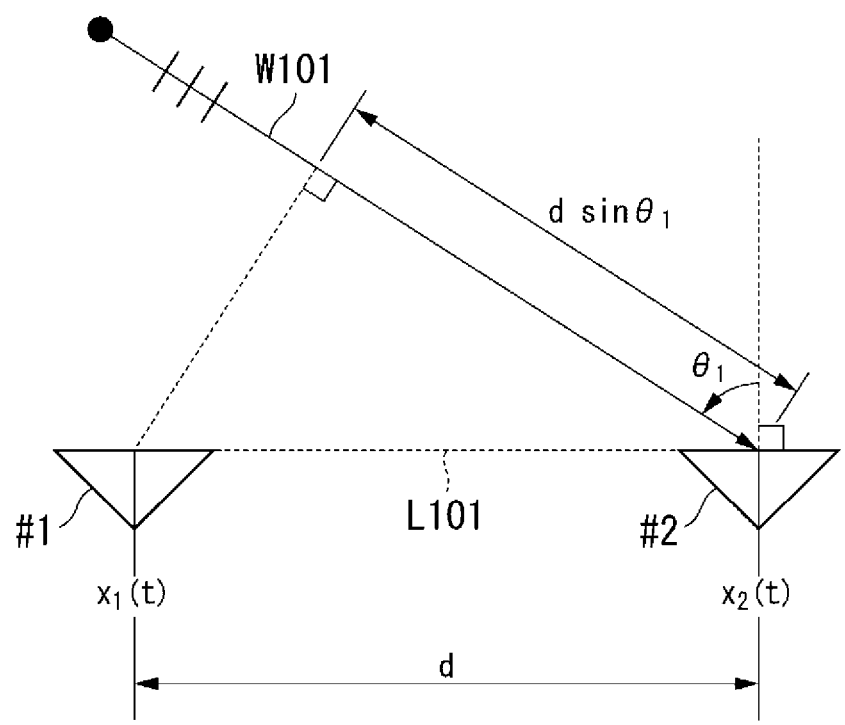
FIG. 2 is an explanatory diagram illustrating an example of arrival direction estimation processing according to the embodiment.

FIG. 2 is an explanatory diagram illustrating an example of arrival direction estimation processing according to the embodiment. In FIG. 2, both #1 and #2 represent sound wave receiving elements. That is, FIG. 2 illustrates two sound wave receiving elements of the sound wave receiving element #1 and the sound wave receiving element #2. FIG. 2 illustrates that the distance between the sound wave receiving element #1 and the sound wave receiving element #2 is d. In FIG. 2, a wave W101 represents an estimation target sound wave. The information that the distance between the sound wave receiving element #1 and the sound wave receiving element #2 is d is an example of element arrangement information.

In FIG. 2, the propagation direction of the estimation target sound wave is a direction in which an angle formed by a perpendicular line of a straight line (hereinafter referred to as a "reception reference line") connecting the sound wave receiving element #1 and the sound wave receiving element #2 becomes an angle $\theta_1$ in a direction of the sound wave receiving element that receives the estimation target sound wave at an earlier time. Therefore, when the angle $\theta_1$ is not 0° or 180°, the propagation direction of the estimation target sound wave is not perpendicular to the reception reference line. In FIG. 2, the reception reference line is a straight line L101. The angle $\theta_1$ is an example of reception direction information. Therefore, the angle $\theta_1$ is an example of a direction of a reception direction vector.

FIG. 2 illustrates that, when the propagation direction of the estimation target sound wave is not perpendicular to the reception reference line, the time at which the sound wave receiving element #1 receives the estimation target sound wave is different from the time at which the sound wave receiving element #2 receives the estimation target sound wave.

In FIG. 2, $x_1(t)$ represents a time series of various sound waves received by the sound wave receiving element #1. In FIG. 2, $x_2(t)$ represents a time series of various sound waves received by the sound wave receiving element #2. Hereinafter, the time series of various sound waves received by the sound wave receiving element is referred to as a reception time-series signal. Since the reception time-series signal is a time series including the estimation target time-series signal, the reception time-series signal is a time series representing a sound wave including the estimation target sound wave. $x_1(t)$ and $x_2(t)$ are examples of a time-series signal including an estimation target time-series signal.

When the time difference between the time at which the sound wave receiving element #1 receives the estimation target sound wave and the time at which the sound wave receiving element #2 receives the estimation target sound wave is $\tau$, and the sound wave receiving element #1 receives the estimation target sound wave earlier, $x_1(t-\tau)=x_2(t)$ is satisfied. In such a case, according to Section 3-1-1 of Reference Literature 1, the following relationship of Formula (3) is established. c represents the propagation speed of the estimation target sound wave. Note that the propagation speed c is a constant.

[Math. 3]

$$\sin(\theta_1)=\tau \times (c/d) \quad (3)$$

Incidentally, a cross-correlation value $\phi_n(t)$ illustrated in Formula (2) becomes a maximum when the similarity between w and the time series obtained by delaying $x_n$ by t is the highest. Therefore, in a case where w and $x_n$ in Formula (2) are replaced with $x_1$ and $x_2$, respectively, the cross-correlation value $\phi_n(t)$ becomes a maximum when the time difference $\tau$ between the time at which the sound wave receiving element #1 receives the estimation target sound wave and the time at which the sound wave receiving element #2 receives the estimation target sound wave is substituted into t. Therefore, in the method described in Section 3-1 of Reference Literature 1, w and $x_n$ in Formula (2) are replaced with $x_1$ and $x_2$, respectively, and t that maximizes the cross-correlation value cross-correlation value $\phi_n(t)$, that is, $\tau$, is calculated. In the method described in Section 3-1 of Reference Literature 1, next, the arrival direction of the direct wave is estimated using the element arrangement information and Formula (3). The arrival direction is a direction in which an angle formed by a perpendicular line of a reception reference line becomes an angle $\theta_1$ in a direction of a sound wave receiving element that receives an estimation target sound wave at an earlier time. In this way, the arrival direction is estimated in the method of 3-1 of Reference Literature 1.

In the communication system 100, extraction processing is executed before execution of the arrival direction estimation processing. Therefore, in the communication system 100, the cross-correlation value satisfying the selection rule is already obtained for each sound wave receiving element before execution of the arrival direction estimation processing, and the time difference $\tau$ satisfying the selection rule is also already obtained for each sound wave receiving element before execution of the arrival direction estimation processing.

Hereinafter, processing of acquiring the time difference $\tau$ satisfying the selection rule is referred to as reference time difference acquisition processing. The reference time difference acquisition processing is processing of obtaining a time difference $\tau$ that gives a cross-correlation value satisfying the selection rule. Since the time difference $\tau$ satisfying the selection rule is obtained in the process of the extraction processing as described above, the reference time difference acquisition processing is processing of reading the time difference $\tau$ obtained by the extraction processing.

Note that the time difference $\tau$ satisfying the selection rule is a time difference (hereinafter referred to as an "element reference time difference") of the time at which the known time series transmitted by the transmitter 9 arrives at each sound wave receiving element. Therefore, the element reference time difference $\tau$ is, for example, a time difference $\tau$ between a time $t_1$ at which $\phi_1(t)$ in Formula (2) becomes a maximum and a time $t_2$ at which $\phi_2(t)$ becomes a maximum, and is a time difference $\tau$ satisfying the selection rule.

Therefore, in the communication system 100, a time difference between the times at which the estimation target sound wave is received between the sound wave receiving elements is acquired using the time at which the cross-correlation value obtained in the extraction processing becomes a maximum. For example, a time difference (hereinafter referred to as an "inter-element time difference $T_{ij}$") between the times at which the estimation target sound wave is received for a j-th sound wave receiving element of an i-th sound wave receiving element is a value obtained by subtracting a time argmax $\{\phi_i(t)\}$ at which a cross-correlation value $\phi_i(t)$ becomes a maximum from a time argmax $\{\phi_j(t)\}$ at which a cross-correlation value $\phi_j(t)$ becomes a maximum. Note that both i and j are integers of 1 or more and N or less, and i and j are values different from each other.

Hereinafter, processing of acquiring the inter-element time difference for each element set $\{i, j\}$ on the basis of the cross-correlation value is referred to as time difference acquisition processing. The time difference acquisition processing is, for example, processing represented by the following Formula (4).

[Math. 4]

$$T_{ij}=\text{argmax } \phi_j[t]-\text{argmax } \phi_i[t] \quad (4)$$

The element set $\{i, j\}$ is a non-ordered pair including two elements of the i-th sound wave receiving element and the j-th sound wave receiving element among the N sound wave receiving elements. Therefore, when there are N sound wave receiving elements, the number of element sets is $_NC_2(=\{N\times (N-1)\}/2)$. Note that the numbering of the i-th and the j-th is an expression used for simplicity of description when the N sound wave receiving elements are identified from each other, and each sound wave receiving element does not necessarily need to be numbered. Therefore, instead of the expression of the i-th sound wave receiving element, the i-th sound wave receiving element may be expressed as a sound wave receiving element identified from other sound wave receiving elements by the identifier i.

In the communication system 100, after the time difference acquisition processing is executed, the arrival direction of the estimation target sound wave is estimated using the obtained inter-element time difference $T_{ij}$ and element arrangement information. Specifically, the value on the left side of the following Formula (5) in which τ in Formula (3) is replaced with $T_{ij}$ is acquired for each element set {i, j}, and the statistical value of the angle indicated by the acquired value is acquired. The statistical value is, for example, an average.

[Math. 5]

$$\sin(\theta_{ij}) = T_{ij} \times (c/d_{ij}) \quad (5)$$

In Formula (5), $d_{ij}$ is a distance between the i-th sound wave receiving element and the j-th sound wave receiving element. $\theta_{ij}$ is a value defined by Formula (5). The statistical value is represented by, for example, the following Formula (6).

[Math. 6]

$$\theta = \frac{1}{{}_nC_2} \sum_{\{i,j\}} \theta_{ij} \quad (6)$$

The direction in which the angle formed by the perpendicular line of the reception reference line and the reception reference line becomes the angle θ in Formula (6) in the direction of the sound wave receiving element that receives the estimation target sound wave at an earlier time is the arrival direction. When the number of sound wave receiving elements is N, the reception reference line is one line connecting the N sound wave receiving elements.

Note that the arrival direction estimation processing may be, for example, processing of executing the method described in Section 3-3-2 of Reference Literature 1 below. In the method described in Section 3-3-2 of Reference Literature 1, unlike the method described in Section 3-3-1 of Reference Literature 1, it is not always necessary to calculate the time difference. That is, the time difference acquisition processing does not necessarily need to be executed. In the case of executing the method described in Section 3-3-2 of Reference Literature 1, if a signal reception sound wave in a state in which various sound waves received by a plurality of sound wave receiving elements are added is acquired, the arrival direction of the estimation target sound wave can be estimated.

The receiver 1 estimates a quantity (hereinafter referred to as a "reception-direction-speed-related quantity") related to the speed in the reception direction of the receiver 1 using the ground-speed-related quantity vector and the result of the arrival direction estimation processing. The reception-direction-speed-related quantity may be a signed speed (hereinafter the reception direction coded speed is referred to as a "reception direction signed speed") in the reception direction of the receiver 1, or may be a change amount in the signed speed in the reception direction of the receiver 1 in a predetermined period.

When the ground-speed-related quantity is a ground speed vector, the reception-direction-speed-related quantity is a reception direction signed speed. That is, when a speed vector representing the ground speed of the receiver 1 at the start time of the unit time is used for $V_0$ in Formula (1), the reception-direction-speed-related quantity is the signed speed in the reception direction of the receiver 1. When the ground-speed-related quantity is a change amount in the unit time of the ground speed vector, the reception-direction-speed-related quantity is a change amount in the unit time of the reception direction signed speed. That is, when a speed vector in which all elements are 0 is used for $V_0$ in Formula (1), the reception-direction-speed-related quantity is a change amount in the unit time of the signed speed in the reception direction of the receiver 1.

Hereinafter, processing of estimating the reception-direction-speed-related quantity using the ground-speed-related quantity and the result of the arrival direction estimation processing is referred to as reception-direction-speed-related quantity estimation processing. In addition, a case where a speed vector in which all elements are 0 is used as the speed vector $V_0$ will be described below for simplicity of description. A method of acquiring the information indicating the reception direction (that is, the reception direction information) will be described after the description of the reception-direction-speed-related quantity estimation processing.

<Reception-Direction-Speed-Related Quantity Estimation Processing>

The reception-direction-speed-related quantity estimation processing may be any processing as long as the reception-direction-speed-related quantity can be estimated using the ground-speed-related quantity and the result of the arrival direction estimation processing. The reception-direction-speed-related quantity estimation processing is, for example, processing of obtaining an inner product of a ground-speed-related quantity vector and a reception direction vector normalized to length 1. The direction of the reception direction vector is the direction of the reception direction. Therefore, the reception direction vector is an example of information indicating the reception direction.

More specifically, the reception-direction-speed-related quantity estimation processing is, for example, processing represented by the following Formula (7).

[Math. 7]

$$V = V_r \cdot \frac{e}{|e|} \quad (7)$$

A vector e represents a reception direction vector. |e| represents the length of the vector e. V represents a reception-direction-speed-related quantity. Therefore, Formula (7) means that the inner product of a vector $V_r$ and the normalized reception direction vector e is a reception-direction-speed-related quantity V. The vector $V_r$ is a ground-speed-related quantity vector of the receiver 1. For simplicity of description, the communication system 100 will be described below by taking a case where the length of the reception direction vector is 1 as an example.

Figure 3:
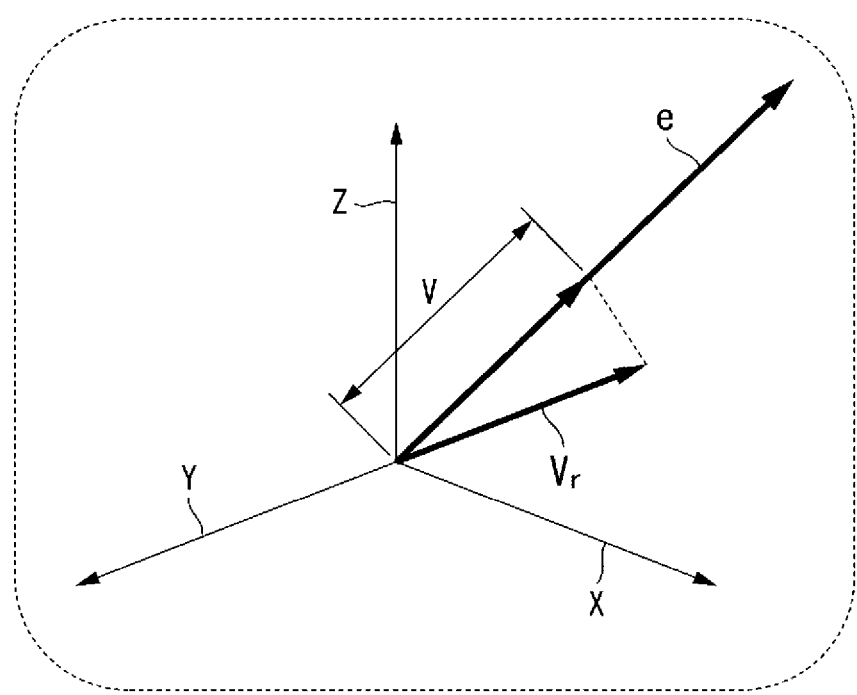
FIG. 3 is an explanatory diagram illustrating a relationship between a reception-direction-speed-related quantity V and a reception direction vector e in the embodiment.

FIG. 3 is an explanatory diagram illustrating the relationship between the reception-direction-speed-related quantity V and the reception direction vector e in the embodiment. FIG. 3 illustrates that the length of the positive oblique shadow vector obtained as a result of hatching the ground-speed-related quantity vector $V_r$ represented by Formula (1) in the reception direction vector e is the reception-direction-speed-related quantity V.

<Processing of Acquiring Reception Direction Information>

The processing of acquiring reception direction information (hereinafter referred to as "reception direction information acquisition processing") is processing of estimating an arrival direction of a direct wave or a multipath wave by executing the extraction processing and the arrival direction estimation processing. That is, the reception direction information acquisition processing may be, for example, processing of estimating the arrival direction of the sound wave arriving at the time at which the cross-correlation value has a magnitude based on the selection rule, or may be a method of performing the method described in Section 3-3-2 of Reference Literature 1 on an arbitrary estimation target sound wave.

Figure 4:
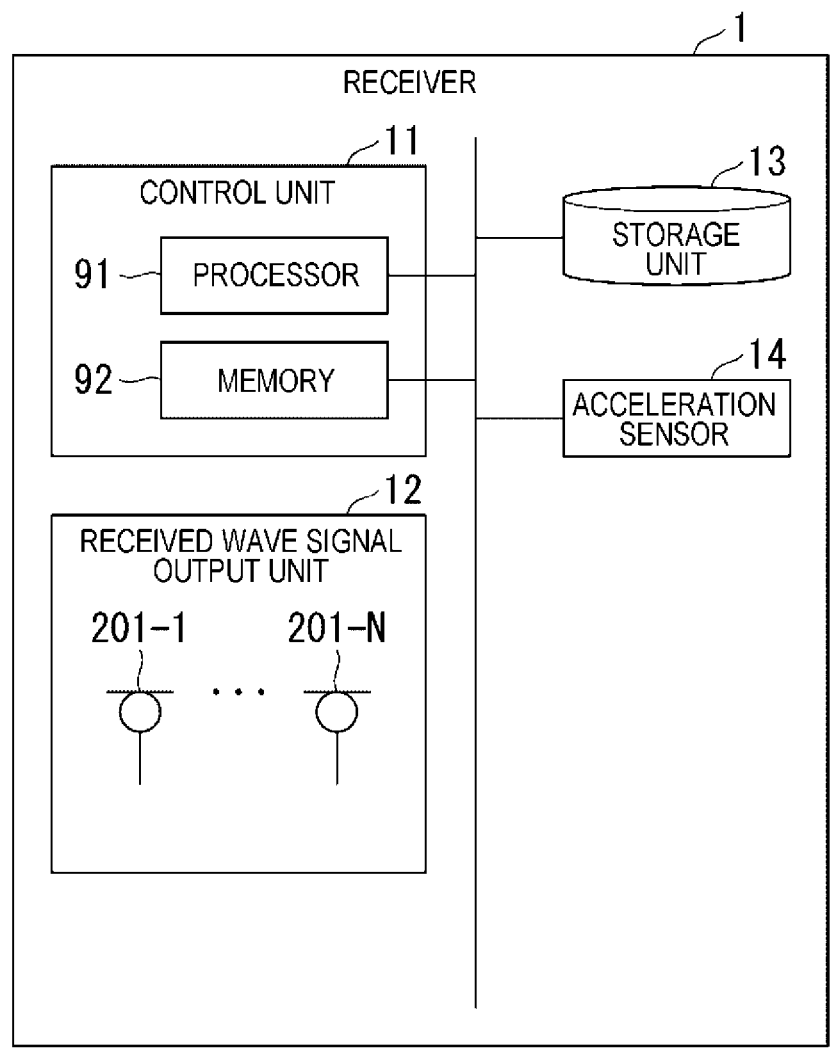
FIG. 4 is a diagram illustrating an example of a hardware configuration of a receiver 1 according to the embodiment.

FIG. 4 is a diagram illustrating an example of a hardware configuration of the receiver 1 according to the embodiment. The receiver 1 includes a control unit 11 including a processor 91 such as a central processing unit (CPU) and a memory 92, which are connected by a bus, and executes a program. The receiver 1 functions as a device including the control unit 11, a received wave signal output unit 12, a storage unit 13, and an acceleration sensor 14 by executing a program.

More specifically, the processor 91 reads the program stored in the storage unit 13, and stores the read program in the memory 92. The processor 91 executes the program stored in the memory 92, whereby the receiver 1 functions as a device including the control unit 11, the received wave signal output unit 12, the storage unit 13, and the acceleration sensor 14.

The control unit 11 controls operations of various functional units included in the receiver 1. The control unit 11 executes, for example, reception direction speed speed estimation processing. The control unit 11 executes, for example, extraction processing. The control unit 11 executes, for example, arrival direction estimation processing. The extraction processing may be, for example, a method described in Reference Literature 3 to be described later.

The received wave signal output unit 12 includes a sound wave receiving element 201-1 to a sound wave receiving element 201-N, and a signal detection unit 202. In this way, the received wave signal output unit 12 includes N (that is, a plurality of) sound wave receiving elements. Hereinafter, the sound wave receiving element 201-1 to the sound wave receiving element 201-N will be referred to as sound wave receiving elements 201 in a case where they are not distinguished from each other. Note that the received wave signal output unit 12 does not necessarily need to include a plurality of sound wave receiving elements, and may include one sound wave receiving element 201.

In this way, the received wave signal output unit 12 outputs the time series of the sound waves (hereinafter referred to as a "received wave signal") received by each of the sound wave receiving elements 201. The received wave signal is a signal of a sound wave to which various sound waves arriving at the receiver 1 have been added.

The receiver 1 may include a communication unit that communicates with an external device, and an instruction of the estimation target sound wave may be input to the receiver 1 via the communication unit. When the instruction of the estimation target sound wave is input to the receiver 1, the control unit 11 estimates the arrival direction of the estimation target sound wave indicated by the instruction of the estimation target sound wave.

Note that the instruction of the estimation target sound wave does not necessarily need to be input to the receiver 1, and the control unit 11 may estimate the arrival direction of the sound wave satisfying a predetermined condition related to the estimation target sound wave. The predetermined condition related to the estimation target sound wave is, for example, a condition of a sound wave arriving at an element reference time difference at which a cross-correlation value of received wave signals received by a plurality of sound wave receiving elements becomes a maximum. Note that the processing of estimating the arrival direction of the sound wave satisfying the condition of the sound wave arriving at the element reference time difference at which the cross-correlation value between the known signal and the received wave signal becomes a maximum is processing of estimating the arrival direction of the direct wave.

Hereinafter, for simplicity of description, the communication system 100 will be described by taking a case where it has been stored in advance in the storage unit 13 that the estimation target sound wave is a direct wave as an example. That is, for the sake of simplicity of the following description, the communication system 100 will be described by taking a case where it is determined in advance that the estimation target sound wave is a direct wave as an example.

The storage unit 13 is configured using a non-transitory computer-readable storage medium device such as a magnetic hard disk device or a semiconductor storage device. The storage unit 13 stores various types of information related to the receiver 1. The storage unit 13 stores, for example, element arrangement information in advance. The storage unit 13 stores, for example, information indicating the known time series in advance. The storage unit 13 stores the propagation speed c in advance.

The acceleration sensor 14 acquires a ground acceleration vector $A_r$ indicating the ground acceleration in one or a plurality of directions of the receiver 1. The ground acceleration vector $A_r$ indicates, for example, ground accelerations in three orthogonal directions.

The receiver 1 may include a power unit that generates lift for moving the receiver 1 under the control of the control unit 11. The power unit that generates the lift for moving the receiver 1 is, for example, a propeller with a motor. When the power unit is a propeller with a motor, the motor is rotated by the control of the control unit 11, and the propeller is rotated by the rotation of the motor. The rotation of the propeller generates lift.

Figure 5:
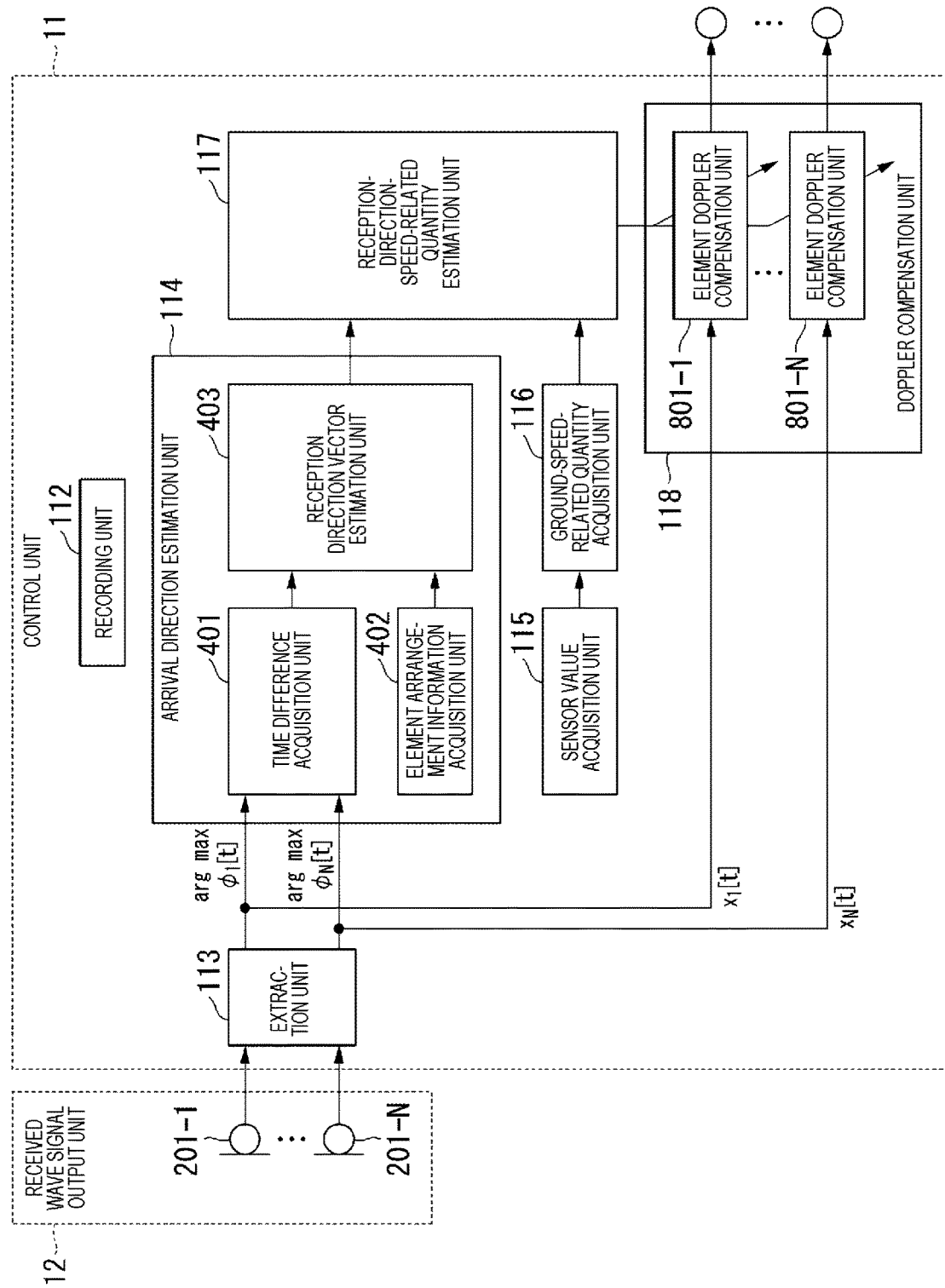
FIG. 5 is a diagram illustrating an example of a functional configuration of a control unit 11 according to the embodiment.

FIG. 5 is a diagram illustrating an example of a functional configuration of the control unit 11 according to the embodiment. The control unit 11 includes a recording unit 112, an extraction unit 113, an arrival direction estimation unit 114, a sensor value acquisition unit 115, a ground-speed-related quantity acquisition unit 116, a reception-direction-speed-related quantity estimation unit 117, and a Doppler compensation unit 118.

The functional configuration of the arrival direction estimation unit 114 in FIG. 5 is an example of the functional configuration in a case where the arrival direction estimation processing is processing of executing the method of estimating the arrival direction described in Section 3-3-1 of Reference Literature 1. Therefore, when the arrival direction estimation processing is processing of executing another method of estimating the arrival direction, the configuration of the arrival direction estimation unit 114 is not necessarily the configuration illustrated in FIG. 5 as long as another method of estimating the arrival direction can be executed.

The recording unit 112 stores various types of information acquired by the control unit 11 in the storage unit 13.

The extraction unit 113 executes extraction processing. The signal including the estimation target sound wave is extracted by the execution of the extraction unit 113. The extraction processing to be executed may be any method as long as a signal including the estimation target sound wave is extracted. The processing of extracting the signal including the estimation target sound wave is, for example, a method based on a cross-correlation value between the known signal and the received wave signal. In addition, the reception time of the signal including the estimation target sound wave may be acquired according to the arrival direction estimation method performed by the arrival direction estimation unit 114.

The arrival direction estimation unit 114 executes arrival direction estimation processing. The arrival direction estimation unit 114 estimates the arrival direction of the estimation target sound wave based on the data waves received by the sound wave receiving element 201-1 to the sound wave receiving element 201-N by executing the arrival direction estimation processing. That is, the arrival direction estimation unit 114 estimates the reception direction vector based on the data waves received by the sound wave receiving element 201-1 to the sound wave receiving element 201-N by executing the arrival direction estimation processing.

The arrival direction estimation unit 114 includes a time difference acquisition unit 401, an element arrangement information acquisition unit 402, and a reception direction vector estimation unit 403. The time difference acquisition unit 401 executes the time difference acquisition processing for each element set of $_NC_2(=\{N\times(N-1)\}/2)$. The element arrangement information acquisition unit 402 acquires element arrangement information. More specifically, the element arrangement information acquisition unit 402 reads the element arrangement information stored in the storage unit 13.

The reception direction vector estimation unit 403 estimates the arrival direction by Formulas (5) and (6) on based on the time difference and the element arrangement information in each element set acquired by the time difference acquisition unit 401. That is, the reception direction vector estimation unit 403 estimates the reception direction vector based on the time difference and the element arrangement information in each element set estimated by the time difference acquisition unit 401.

The sensor value acquisition unit 115 acquires the ground acceleration vector $A_t$ acquired by the acceleration sensor 14.

The ground-speed-related quantity acquisition unit 116 executes ground-speed-related quantity acquisition processing. By executing the ground-speed-related quantity acquisition processing, the ground-speed-related quantity acquisition unit 116 acquires the ground speed vector $V_r$ using the ground acceleration vector $A_t$.

The reception-direction-speed-related quantity estimation unit 117 executes reception-direction-speed-related quantity estimation processing. By executing the reception-direction-speed-related quantity estimation processing, the reception-direction-speed-related quantity estimation unit 117 acquires the reception-direction-speed-related quantity V based on the result of the estimation from the arrival direction estimation unit 114 and the ground-speed-related quantity $V_r$.

The Doppler compensation unit 118 compensates for the received wave signal for each of the sound wave receiving elements 201 based on the reception-direction-speed-related quantity V. The method of compensating for the received wave signal executed by the Doppler compensation unit 118 is, for example, the method described in Reference Literature 2.

Reference Literature 2: Baosheng Li, Shengli Zhou, Milica Stojanovic, Lee Freitag, Peter Willett, "Non-Uniform Doppler Compensation for Zero-Padded OFDM over Fast-Varying Underwater Acoustic Channels", IEEE OCEANS 2007-Europe, Aberdeen, Scotland, 18-21, June 2007, pp. 1-pp. 6.

The method described in Reference Literature 2 will be briefly described. The Doppler compensation unit 118 compensates for a received wave signal for each of the sound wave receiving elements 201 by, for example, executing processing (hereinafter referred to as "element Doppler compensation processing") represented by the following Formulas (8) to (10) for each of the sound wave receiving elements 201. That is, the Doppler compensation unit 118 compensates for waveform distortion due to the Doppler effect for each of the sound wave receiving elements 201.

[Math. 8]

$$z(t) = x\left(\frac{T_{tx}}{T_{rx}}t\right) \quad (8)$$

[Math. 9]

$$r(t) = \exp(-j2\pi\epsilon t)z(t) \quad (9)$$

[Math. 10]

$$\epsilon = \left(1 - \frac{T_{tx}}{T_{rx}}\right)f_c \quad (10)$$

In Formulas (8) to (10), z(t) represents a time series after resampling of the received wave signal x(t). In Formulas (8) to (10), x(t) represents a received wave signal. In Formulas (8) to (10), r(t) represents a time series of a result of performing carrier frequency offset compensation (CFO compensation) on the time series z(t) after resampling. In Formulas (8) to (10), j represents an imaginary unit. In the Formulas (8) to (10), exp(•) represents an exponential function with Napier's constant at the bottom.

In the Formulas (8) to (10), $f_c$ represents the carrier frequency of the received wave signal x(t). In Formulas (8) to (10), $T_{rx}$ is the length of the received wave signal x(t) received by the receiver.

In Formulas (8) to (10), $T_{tx}$ is the length of the time series of the estimation target sound wave at the point in time when the received wave signal received by the sound wave receiving element is transmitted from the transmitter.

Formula (8) represents resampling. Specifically, Formula (8) represents that the received wave signal z(t) in which the sample point is compensated for is obtained by performing resampling based on the time expansion/contraction ratio of the received wave signal x(t). Formula (9) represents CFO compensation. The CFO compensation means that a received wave signal having a carrier frequency offset (CFO) caused by the Doppler effect is guaranteed to have a carrier frequency at the time of transmission. ε(t) in Formula (10) represents a carrier frequency offset occurring in the time series z(t) after resampling.

The Doppler compensation unit 118 includes, for example, an element Doppler compensation unit 801 for each of the sound wave receiving elements 201, thereby performing element Doppler compensation processing for each of the sound wave receiving elements 201. The element Doppler compensation unit 801 executes element Doppler compensation processing on the received wave signal of the corresponding sound wave receiving element 201.

The element Doppler compensation unit 801 exists for each sound wave receiving element 201. Therefore, for example, in a case where the number of the sound wave receiving elements 201 is N, N element Doppler compensation units 801 of an element Doppler compensation unit 801-1 to an element Doppler compensation unit 801-N exist in the Doppler compensation unit 118.

The Doppler compensation unit 118 outputs the received wave signal after compensation. Predetermined signal processing is executed on the received wave signal after compensation output from the Doppler compensation unit 118.

Figure 6:
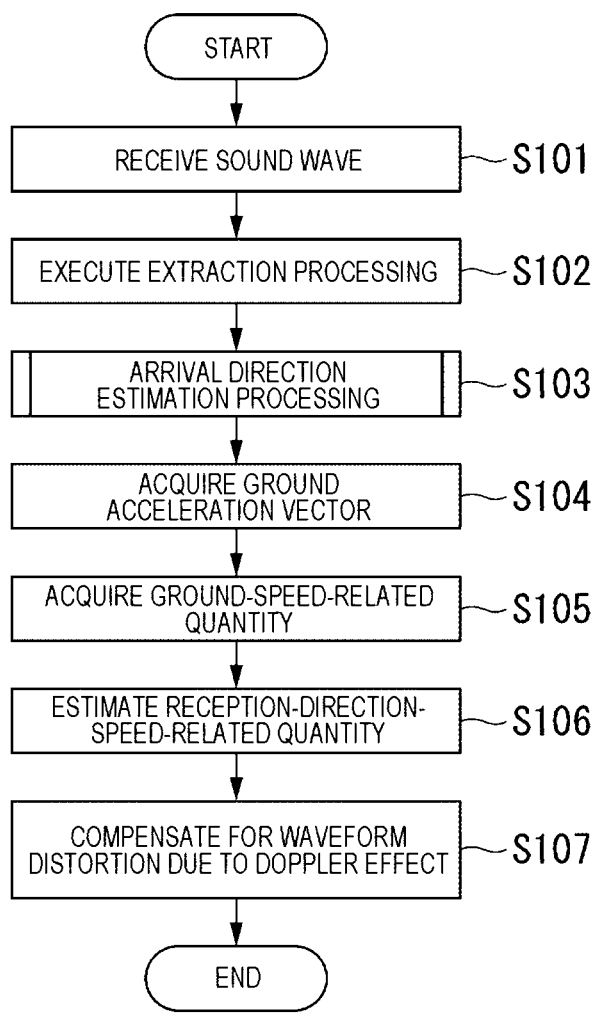
FIG. 6 is a flowchart illustrating an example of a flow of processing executed by the communication system 100 according to the embodiment.

FIG. 6 is a flowchart illustrating an example of a flow of processing executed by the communication system 100 according to the embodiment.

The sound wave receiving element 201 receives the sound wave transmitted by the transmitter 9 (step S101). Subsequently, the extraction unit 113 executes extraction processing (step S102). In the extraction processing, for example, a sound wave including an estimation target sound wave is acquired by acquiring a cross-correlation value. In the extraction processing, the reception time of the estimation target sound wave may be acquired according to the arrival direction estimation processing performed in the next step S103.

Subsequently, the arrival direction estimation unit 114 executes arrival direction estimation processing. By executing the arrival direction estimation processing, the arrival direction estimation unit 114 estimates the arrival direction of the estimation target sound wave based on the reception time of the signal including the estimation target time-series signal acquired in step S102 or the estimation target time-series signal (step S103).

Subsequently, the sensor value acquisition unit 115 acquires the ground acceleration vector acquired by the acceleration sensor 14 (step S104). Subsequently, the ground-speed-related quantity acquisition unit 116 acquires the ground-speed-related quantity by executing the ground-speed-related quantity acquisition processing (step S105).

Subsequently, the reception-direction-speed-related quantity estimation unit 117 executes reception-direction-speed-related quantity estimation processing (step S106). By executing the reception-direction-speed-related quantity estimation processing, the reception-direction-speed-related quantity estimation unit 117 estimates the reception-direction-speed-related quantity based on at least the arrival direction estimated in step S103 and the ground-speed-related quantity acquired in step S105.

Subsequently, the Doppler compensation unit 118 compensates for waveform distortion of the estimation target sound wave for each of the sound wave receiving element 201-1 to the sound wave receiving element 201-N (step S107).

Note that, if the processing of step S103 and the processing of step S104 are executed after the execution of the processing of step S102 and before the execution of the processing of step S105, step S104 does not necessarily need to be executed after step S103. For example, the processing of step S104 may be executed after step S102, and then the processing of step S103 may be executed.

Note that, as described above, the arrival direction estimation processing executed in step S103 may be any method as long as the arrival direction of the estimation target sound wave can be estimated based on at least the element arrangement information. Hereinafter, an example of a flow of the arrival direction estimation processing executed in step S103 will be described with reference to FIG. 7.

Figure 7:
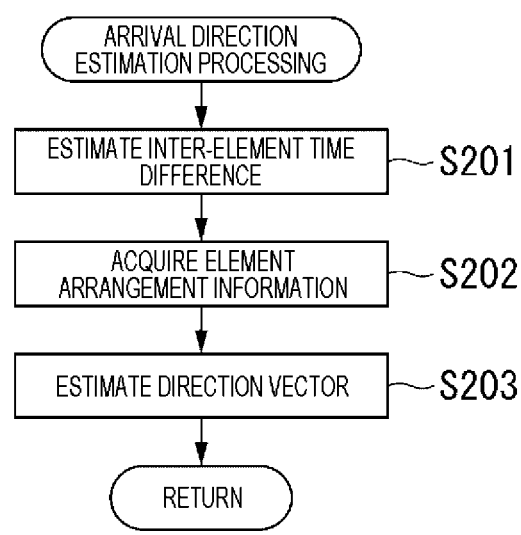
FIG. 7 is a flowchart illustrating an example of a flow of the arrival direction estimation processing according to the embodiment.

FIG. 7 is a flowchart illustrating an example of a flow of the arrival direction estimation processing according to the embodiment. The time difference acquisition unit 401 executes time difference acquisition processing (step S201). By executing the time difference acquisition processing, the time difference acquisition unit 401 estimates the inter-element time difference $T_{ij}$ for each element set. Subsequently, the element arrangement information acquisition unit 402 acquires element arrangement information (step S202). Subsequently, the reception direction vector estimation unit 403 estimates a reception direction vector based on the inter-element time difference obtained in step S201 and the element arrangement information obtained in step S202 (step S203).

Note that the processing of step S201 and the processing of step S202 are not necessarily executed in this order as long as they are executed before the execution of the processing of step S203. For example, the processing of step S201 may be executed after step S202, and then the processing of step S203 may be executed.

The communication system 100 configured as described above includes the control unit 11 that estimates the arrival direction of the estimation target sound wave and estimates the reception-direction-speed-related quantity on the basis of the estimated arrival direction. The control unit 11 estimates the Doppler shift using the acceleration sensor capable of sequentially acquiring the ground-speed-related quantity without being affected by the distortion of the sound wave due to the combination of the direct wave and the multipath wave, and the reception direction information having a low correlation between the estimation target sound wave and the sound wave other than the estimation target sound wave.

Furthermore, for this reason, the communication system 100 can sequentially estimate and compensate for the change amount in waveform distortion due to the Doppler effect of the estimation target sound wave with higher accuracy than a technique for estimating a Doppler shift from a composite wave obtained by combining a direct wave and a multipath wave and compensating for waveform distortion due to the Doppler effect. Therefore, the communication system 100 can correct waveform distortion due to the Doppler effect with higher accuracy.

Furthermore, the communication system 100 configured as described above includes the control unit 11 that estimates the reception-direction-speed-related quantity based on the sound wave received by the sound wave receiving element 201. More specifically, the control unit 11 extracts a sound wave including the estimation target sound wave, estimates the arrival direction of the estimation target sound wave based on the extraction result, and estimates the reception-direction-speed-related quantity on the basis of the ground-speed-related quantity. The ground-speed-related quantity is acquired by using a measurement value of the acceleration sensor. The measurement value of the acceleration sensor is a result of the measurement by the acceleration sensor. The measurement value of the acceleration sensor is not affected by the sound wave.

In the case of a technique for compensating for waveform distortion due to the Doppler effect using only unmodulated waves, the waveform of the unmodulated waves is distorted due to the influence of multipath waves, and thus the estimation accuracy of the Doppler effect is not high.

On the other hand, since the communication system 100 includes the control unit 11, unlike a technique for compensating for waveform distortion using only unmodulated waves, the waveform distortion compensation is performed on the basis of a measurement value of an acceleration sensor that is not affected by a sound wave. Therefore, the communication system 100 can sequentially estimate and compensate for the change amount in waveform distortion due to the Doppler effect with high accuracy. Therefore, the communication system 100 can correct waveform distortion due to the Doppler effect with higher accuracy.

Modifications

As described above, in the arrival direction estimation processing, the arrival direction of the multipath wave can be estimated using the multipath wave as the estimation target sound wave. Therefore, the communication system 100 can compensate for waveform distortion due to the Doppler effect not only for direct waves but also for multipath waves.

Note that, in a case where the sound wave receiving element 201-1 to the sound wave receiving element 201-N are not on a straight line, the propagation direction of the estimation target sound wave may indicate an angle forming the propagation direction with respect to a perpendicular line of the reception reference surface instead of the reception reference line. The reception reference surface is a plane including the sound wave receiving element 201-1 to the sound wave receiving element 201-N.

Note that the number of the acceleration sensors 14 included in the receiver 1 is not necessarily one, and may be plural. In a case where there are a plurality of acceleration sensors 14, for example, an average vector of a plurality of ground acceleration vectors is used instead of the ground acceleration vector measured by one acceleration sensor 14 in the ground-speed-related quantity acquisition processing. In this way, the ground-speed-related quantity acquisition unit 116 may acquire the ground-speed-related quantity on the basis of the measurement values of the plurality of acceleration sensors 14. Note that the average may be a weighted average. In the case of a weighted average, the weight is desirably larger for the acceleration sensor 14 closer to the sound wave receiving element 201.

Note that the acceleration sensor 14 desirably outputs acceleration with respect to the reception reference surface. However, in a case where the acceleration sensor 14 outputs the acceleration with respect to the surface deviated from the reception reference surface, processing of separately compensating for the output of the acceleration sensor 14 may be performed in the communication system 100.

Note that, when the ground speed vector is acquired, processing of removing noise from each element of the ground acceleration vector acquired by the acceleration sensor 14 (hereinafter referred to as "noise removal processing") may be performed. Specifically, the noise removal processing is processing of passing an electrical signal output from the acceleration sensor 14 through a filter that removes noise and transmits a signal indicating an acceleration vector. The filter that removes noise and transmits the signal indicating the acceleration vector may be, for example, a low-pass filter, a loop filter, a moving average filter, or a band-pass filter.

The noise removal processing may be executed before the acceleration vector is used in the ground-speed-related quantity acquisition processing. Therefore, the noise removal processing may be executed by the sensor value acquisition unit 115 or may be executed by the ground-speed-related quantity acquisition unit 116.

Note that the communication system 100 may include a residual frequency offset compensation unit 119 that compensates for the frequency offset remaining in the signal output from the Doppler compensation unit 118.

Figure 8:
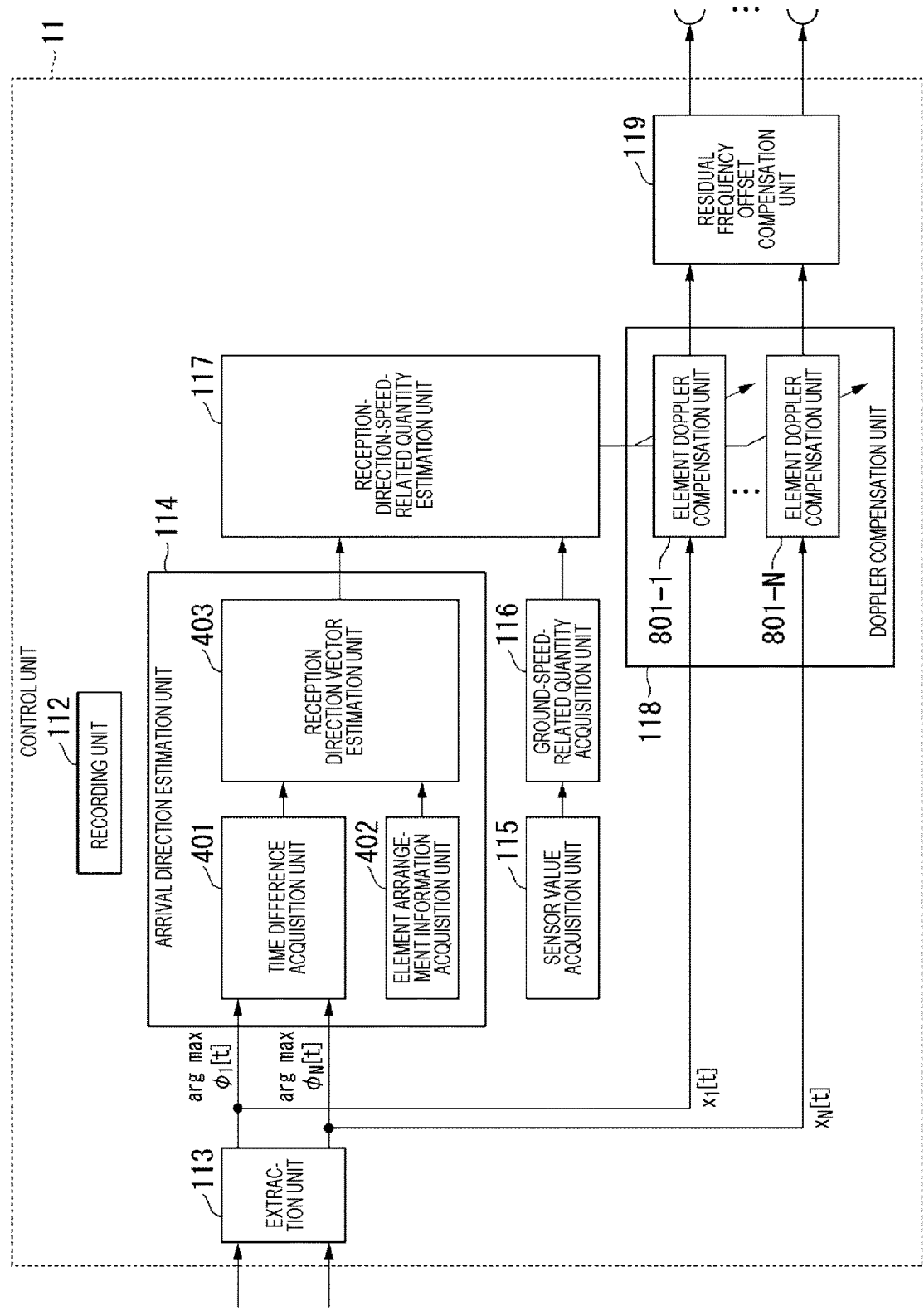
FIG. 8 is a diagram illustrating an example of a residual frequency offset compensation unit 119 according to a modification.

FIG. 8 is a diagram illustrating an example of the residual frequency offset compensation unit 119 according to a modification. The residual frequency offset compensation unit 119 is included in the control unit 11, for example.

The residual frequency offset compensation unit 119 executes linear compensation described in, for example, Reference Literature 3.

Reference Literature 3: B. S. Sharif, J. Neasham, O. R. Hinton, and A. E. Adams, "A Computationally Efficient Doppler Compensation System for Underwater Acoustic Communications," IEEE Journal of Oceanic Engineering, vol. no. 1, pp. 52-pp. 61, January 2000.

The residual frequency offset compensation unit 119 may execute, for example, processing of compensating for the frequency offset by a phase locked loop (PLL) on the received wave signal after compensation.

The residual frequency offset compensation unit 119 may execute, for example, linear compensation described in Reference Literature 3, and then execute processing of compensating for the frequency offset by the PLL.

Note that the communication system 100 may include an initial speed acquisition unit 120. The initial speed acquisition unit 120 acquires an initial speed of the receiver 1. When the initial speed has been stored in advance in the storage unit 13, for example, the initial speed acquisition unit 120 reads the initial speed from the storage unit 13. The processing executed by the initial speed acquisition unit 120 may be any method as long as the initial speed can be estimated. For example, an estimation value based on the amount of Doppler shift and the ground acceleration acquired instantaneously using the reference wave may be used, or the initial speed may be acquired by estimation based on the preceding ground acceleration. Alternatively, estimation may be performed using the Ambiguity Function described in Reference Literature 3.

Figure 9:
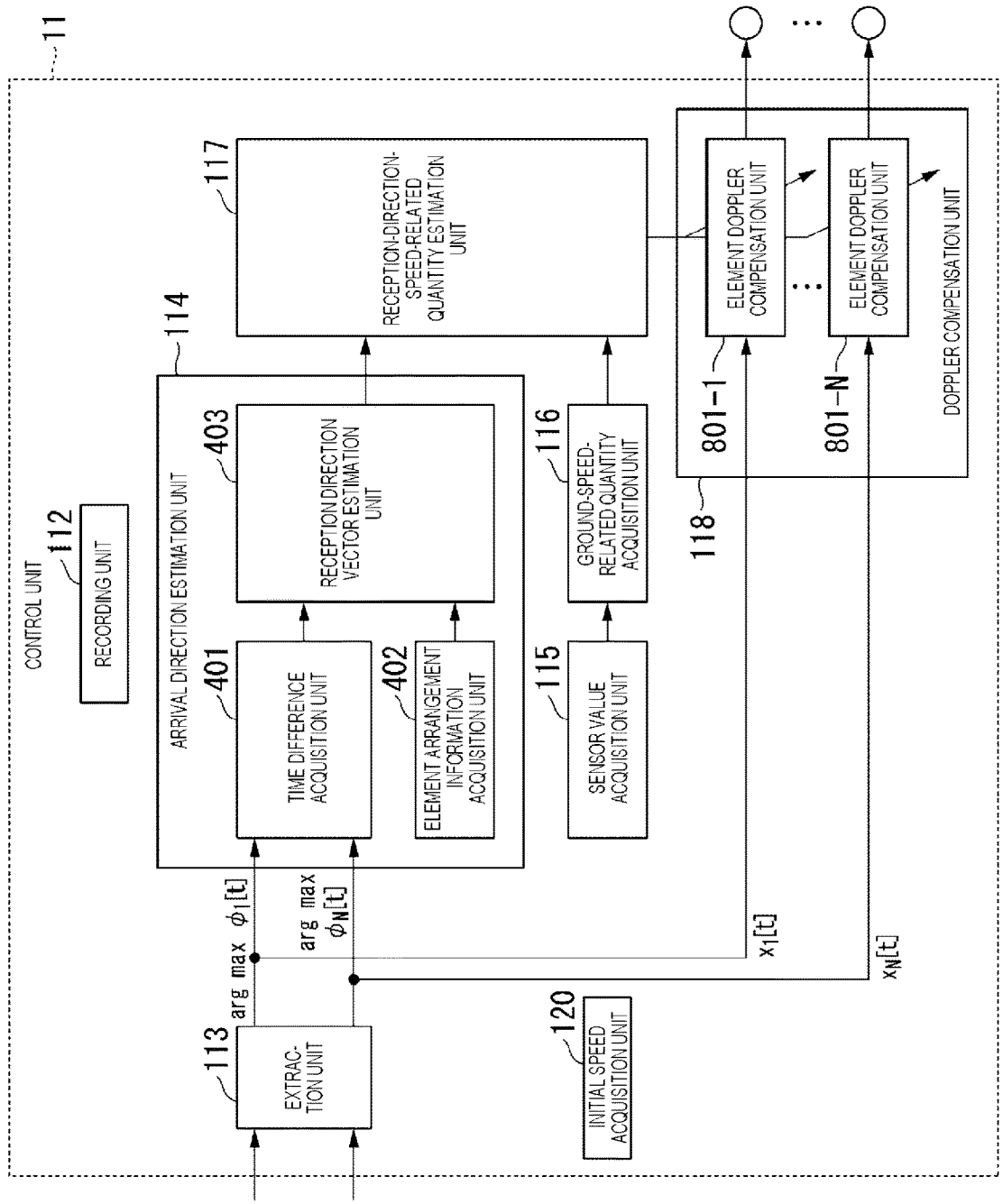
FIG. 9 is a diagram illustrating an example of an initial speed acquisition unit 120 according to a modification.

FIG. 9 is a diagram illustrating an example of the initial speed acquisition unit 120 according to a modification. The initial speed acquisition unit 120 may acquire the initial speed at any timing as long as the initial speed can be acquired before the ground-speed-related quantity acquisition processing by the ground-speed-related quantity acquisition unit 116 is executed. In a case where the initial speed acquisition unit 120 acquires the initial speed, the ground-speed-related quantity acquisition unit 116 executes processing represented by Formula (1) when the ground-speed-related quantity is acquired. That is, when the ground-speed-related quantity is acquired, the ground-speed-related quantity acquisition unit 116 executes processing of acquiring a result obtained by adding an initial speed to a value of time integration of a ground acceleration vector as the ground-speed-related quantity.

In the case of virtual MIMO, the communication system 100 may include one sound wave receiving element 201 (see Reference Literature 4).

Reference Literature 4: Tomoki Murakami, Riku Omiya, Toshiro Nakahira, Koichi Ishihara, Takafumi Hayashi, "Proposal of Virtual Massive MIMO (VM-MIMO)", The Institute of Electronics, Information and Communication Engineers (IEICE) General Conference, Waseda University, Tokyo, Mar. 19 to 22, 2019, B-1-123

In estimating the arrival direction, not only the estimation target sound wave but also an unmodulated wave (hereinafter referred to as a "reference wave") may be used. For example, according to the method of Section 3-3-2 of Reference Literature 1, the arrival direction can be estimated using the reference wave. By further using a reference wave having a frequency different from the carrier frequency of the data wave, the frequency diversity effect can be obtained, and the accuracy of the estimation of the arrival direction is improved.

Note that the receiver 1 does not necessarily need to include all the functional units included in the receiver 1. For example, the arrival direction estimation unit 114, the sensor value acquisition unit 115, the ground-speed-related quantity acquisition unit 116, and the reception-direction-speed-related quantity estimation unit 117 may be mounted on a device different from the recording unit 112, the extraction unit 113, the Doppler compensation unit 118, the received wave signal output unit 12, and the acceleration sensor 14.

For example, the arrival direction estimation unit 114, the sensor value acquisition unit 115, the ground-speed-related quantity acquisition unit 116, and the reception-direction-speed-related quantity estimation unit 117 may be provided in an external device (hereinafter referred to as a "receiver management device") different from the receiver 1 such as a server. In such a case, the receiver management device acquires a result of the extraction from the extraction unit 113, the ground acceleration vector acquired by the acceleration sensor 14, and the element arrangement information from the receiver 1 by communication, and estimates the reception-direction-speed-related quantity on the basis of the acquisition result. The receiver management device transmits the estimated reception-direction-speed-related quantity to the receiver 1 via communication. The Doppler compensation unit 118 compensates for waveform distortion using the reception-direction-speed-related quantity received by the receiver 1.

Note that an object of the problem may be to provide a technique for stably and sequentially estimating and compensating for a change amount of a Doppler shift occurring in an environment in which a moving speed of a receiver changes.

Note that the communication system 100 is an example of a Doppler compensation system.

Note that, all or some of the functions of the communication system 100 and the receiver 1 may be realized using hardware such as an application specific integrated circuit (ASIC), a programmable logic device (PLD), or a field programmable gate array (FPGA). The program may be recorded on a computer-readable recording medium. The "computer-readable recording medium" refers to, for example, a portable medium such as a flexible disk, a magneto-optical disc, a read-only memory (ROM), or a compact disc read-only memory (CD-ROM), or a storage device such as a hard disk built in a computer system. The program may be transmitted via an electrical communication line.

Although the embodiments of the present invention have been described in detail with reference to the drawings, specific configurations are not limited to the embodiments, and include design and the like within the scope of the present invention without departing from the gist of the present invention.

REFERENCE SIGNS LIST

100 Communication system
1 Receiver
11 Control unit
12 Received wave signal output unit
13 Storage unit
14 Acceleration sensor
201-1, 201-N Sound wave receiving element
112 Recording unit
113 Extraction unit
114 Arrival direction estimation unit
115 Sensor value acquisition unit
116 Ground-speed-related quantity acquisition unit
117 Reception-direction-speed-related quantity estimation unit
118 Doppler compensation unit
119 Residual frequency offset compensation unit
120 Initial speed acquisition unit
401 Time difference acquisition unit
402 Element arrangement information acquisition unit
403 Reception direction vector estimation unit
801-1, 801-N Element Doppler compensation unit
9 Transmitter
91 Processor
92 Memory

The invention claimed is:

1. A Doppler compensation system comprising:
a sound wave receiving element configured to receive a sound wave transmitted by a transmitter;
a processor; and
a storage medium having computer program instructions stored thereon, wherein the computer program instruction, when executed by the processor, perform processing of:
acquiring a ground-speed-related quantity that is a physical quantity related to a vector representing a ground speed of a receiver including the sound wave receiving element based on an acceleration of the receiver;
extracting a sound wave including an estimation target sound wave that is a sound wave to be estimated from among sound waves received by the receiver;
estimating an arrival direction of the estimation target sound wave based on the estimation target sound wave;
estimating a quantity related to a speed in a reception direction that is a direction in which the estimation target sound wave viewed from the receiver arrives based on the ground-speed-related quantity acquired by the ground-speed-related quantity acquisition and a result of the estimation from the arrival direction estimation of the estimation target sound wave; and
compensating for waveform distortion due to Doppler effect of the estimation target sound wave based on a result of the estimation from the reception-direction-speed-related quantity estimation.

2. The Doppler compensation system according to claim 1,
wherein the estimation target sound wave is a direct wave transmitted from the transmitter to the receiver.

3. The Doppler compensation system according to claim 1,
wherein the estimation target sound wave is a sound wave that is transmitted from the transmitter and that reaches the receiver after being reflected or scattered at a boundary surface of a substance.

4. The Doppler compensation system according to claim 1,
wherein waveform distortion for each sound wave receiving element due to the Doppler effect of the sound wave received by each sound wave receiving element is compensated for in the compensation for waveform distortion due to Doppler effect.

5. The Doppler compensation system according to claim 1, wherein the computer program instructions further perform processing of:
compensating for a residual frequency offset.

6. The Doppler compensation system according to claim 1, wherein the computer program instructions further perform processing of:
acquiring an initial speed of the receiver,
wherein a result obtained by adding the initial speed to a value of time integration of the acceleration is acquired in the ground-speed-related quantity acquisition as the ground-speed-related quantity when the ground-speed-related quantity is acquired.

7. The Doppler compensation system according to claim 1,
wherein the acceleration of the receiver is acquired by a plurality of acceleration sensors, and
the computer program instructions perform processing of:
acquiring the ground-speed-related quantity on the basis of results of measurement from the plurality of acceleration sensors.

8. A Doppler compensation method comprising:
a sound wave receiving element that receives a sound wave transmitted by a transmitter receiving the sound wave;
acquiring a ground-speed-related quantity that is a physical quantity related to a vector representing a ground speed of a receiver including the sound wave receiving step based on an acceleration of the receiver;
extracting a sound wave including an estimation target sound wave that is a sound wave to be estimated from among sound waves received by the receiver;
estimating an arrival direction of the estimation target sound wave based on the estimation target sound wave;
estimating a quantity related to a speed in a reception direction that is a direction in which the estimation target sound wave viewed from the receiver arrives based on the ground-speed-related quantity acquired in the ground-speed-related quantity acquisition and a result of the estimation in the arrival direction estimation; and
compensating for waveform distortion due to Doppler effect of the estimation target sound wave based on a result of the estimation in the reception-direction-speed-related quantity estimation.

* * * * *